(12) United States Patent
Kim et al.

(10) Patent No.: US 8,396,629 B1
(45) Date of Patent: Mar. 12, 2013

(54) DEVICE AND METHOD FOR DETECTING TIRE POSITION

(75) Inventors: Kang Joo Kim, Gyunggi-do (KR); Hae Seung Hyun, Gyunggi-do (KR); Soon Seock Kang, Gyeonggi-do (KR); Jong Hyeong Song, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 13/350,959

(22) Filed: Jan. 16, 2012

(51) Int. Cl.
*G06F 7/00* (2006.01)
*G01M 17/00* (2006.01)

(52) U.S. Cl. ............. 701/41; 701/47; 701/29.1; 73/146

(58) Field of Classification Search .............. 701/41, 701/45, 47, 29.1; 73/146
See application file for complete search history.

(56) References Cited

U.S. PATENT DOCUMENTS

| | | | | |
|---|---|---|---|---|
| 2,091,826 | A * | 8/1937 | Menger | 396/429 |
| 6,694,227 | B2 * | 2/2004 | Nowottnick et al. | 701/1 |
| 7,385,494 | B2 * | 6/2008 | Mori et al. | 340/442 |
| 2002/0047715 | A1 * | 4/2002 | Holm | 324/683 |
| 2011/0082663 | A1 | 4/2011 | Geisler | |
| 2011/0209536 | A1 * | 9/2011 | Craig et al. | 73/146 |

* cited by examiner

*Primary Examiner* — Fadey Jabr
*Assistant Examiner* — Thomas Ingram
(74) *Attorney, Agent, or Firm* — Ladas & Parry, LLP

(57) ABSTRACT

Disclosed herein is a device for detecting a tire position. The device for detecting a tire position includes a plurality of transmitters provided on each of a plurality of vehicle wheels having a tire and detecting and transmitting a rotation direction and a rotation period of each vehicle wheel; and a receiver mounted on a vehicle body and identifying the left and right of the corresponding vehicle wheel according to the rotation direction of each vehicle wheel and identifying the front and rear of the corresponding vehicle wheel according to the rotation period of each vehicle wheel. By the above configuration, the present invention can identify the tire position without performing the ID information and the ID information update and thus, improve a freedom of change of the tire position and can digitize and process signals from a acceleration sensor to be strong against noise and reduce load.

8 Claims, 6 Drawing Sheets

US 8,396,629 B1

DEVICE AND METHOD FOR DETECTING TIRE POSITION

CROSS REFERENCE TO RELATED APPLICATION

This application claims the benefit of Korean Patent Application No. 10-2011-0112303, filed on Oct. 31, 2011, entitled "Tire Position Detecting Device and Method Thereof", which is hereby incorporated by reference in its entirety into this application.

BACKGROUND OF THE INVENTION

1. Technical Field

The present invention relates to a device and a method for detecting a tire position.

2. Description of the Related Art

Generally, there are a vehicle wheel and a tire of transferring a torque to a vehicle at the time of braking and driving and reducing impact, or the like, transferred from a road surface while supporting a load applied to the vehicle.

The tire is integrally rotated with the vehicle wheel while being inserted into the vehicle wheel so as to absorb impact applied to the road surface and appropriately prevent sliding on the road surface at the time of braking, driving, and rotating. To this end, an air pressure of the tire needs to be constantly maintained at all times according to an external change and a traveling state.

The tire is mounted with an air injection valve protruded to the outside of the tire while communicating with an inner portion of the tire so as to appropriately inject air from the outside so as to constantly maintain the air pressure and the inner portion of the tire is provided with a tire pressure measure system (hereinafter, referred to as 'TPMS') so as to monitor a current air pressure state.

In this case, the TPMS first detects positions of each tire of the vehicle and checks rotational force, air pressure, temperature, or the like, of the tire by using sensors attached to each tire to detect a stable state of the tire.

Therefore, for the driving of the TPMS, a demand for an auto location function of automatically recognizing and differentiating positions of each tire has been increased. When the pressure of the tire is out of a normal level, the auto location function informs a driver whether tires at any position are out of the normal pressure.

Numerous methods for mounting the auto location function in the TPMS have been derived.

For example, in the device and method for detecting a tire position according to the prior art, a transmitter having sensors such as a pressure sensor, or the like, is directly mounted in TPMSs attached to each tire.

Further, each transmitter may be configured to transmit identification signals (hereinafter, referred to as "ID signals") capable of identifying locations together with the pressure signal.

In addition, a main body of a vehicle is provided with a receiver including at least one antenna, wherein the receiver may receive the ID signals through the antenna from each transmitter.

The device for detecting a tire position according to the prior art may be configured to have a reference ID signal registered in the receiver. In this case, each reference ID signal matches with the ID signals from one of the transmitters and is associated with the positions of the transmitters.

Therefore, the receiver may be operated to compare the received ID signals with the reference ID signals registered therein and may identify the transmitters transmitting the ID signals when the ID signals match with the reference ID signals.

However, the device for detecting a tire position according to the prior art having the above-mentioned configuration needs to previously register the ID signals matching with the corresponding transmitter as the reference ID signals within the receiver by connecting the positions of the corresponding transmitters of the vehicle (that is, a vehicle wheel mounted with the corresponding transmitters) with the ID signals. In addition, when the exchange of the tires or the position change of the tires is performed, there is a need to update the reference ID signals within the receiver.

In this case, the position identification process may be complicated and cumbersome and much time may be consumed.

As another method, there is a method for discriminating positions of tires by analyzing signals selectively transmitted to the specific TPMS from LF transmitters mounted near each tire and RF signals transmitted from a sensor module of the TPMS in response to the selectively transmitted signals.

In this case, it is cumbersome to connect signal lines and mounting the LF transmitters around each tire and the installation cost of the system is expensive.

As another method, there is a method for mounting sensors detecting RF signal strength transmitted from each transmitter for each receiver so as to identify the positions (for example, position detections of a front wheel and a rear wheel) of the tires according to the detected RF signal strength of each transmitter.

As described above, the accuracy of the tire position identification according to the RF signal strength may be degraded due to the interference of the surrounding RF signals, or the like.

Therefore, a need exists for a device for rapidly and precisely detecting a tire position at low cost without the separate ID information and a method thereof.

SUMMARY OF THE INVENTION

The present invention has been made in an effort to provide a device and a method for detecting a tire position identifying the left and right of vehicle wheel and detecting a rotation period of each vehicle wheel to identify a front and rear of the vehicle wheel.

According to a preferred embodiment of the present invention, there is provided a device for detecting a tire position, including: a plurality of transmitters provided on each of a plurality of vehicle wheels having a tire and detecting and transmitting a rotation direction and a rotation period of each vehicle wheel; and a receiver mounted on a vehicle body and identifying the left and right of the corresponding vehicle wheel according to the rotation direction of each vehicle wheel transmitted from the transmitter and identifying the front and rear of the corresponding vehicle wheel according to the rotation period of each vehicle wheel.

Each transmitter may include: a first acceleration detection unit converting a first acceleration signal of the corresponding vehicle wheel into a digital signal and outputting the converted digital signal as a square wave; a second acceleration detection unit converting a second acceleration signal of the corresponding vehicle wheel while having a phase difference of 90° from the first acceleration signal into a digital signal and outputting the converted digital signal as the square wave; a quadrature decoder receiving the first and second acceleration signals output as the square wave from the first and second acceleration detection units to detect a phase difference between the two signals, thereby detecting the rotation direction of the corresponding vehicle wheel and counting the number of ticks output whenever the phases of the two signals are changed to detect RPM of the corresponding vehicle wheel; a timer operated as a reference clock signal and receiving the first and second acceleration signals output as the square wave from the first and second acceleration detection units to count the number of clocks of the reference clock signals for each tick output whenever the phases of the two signals are changed, thereby measuring a period of each tick to detect the rotation period of the corresponding vehicle wheel; and a transmitting control unit (MCU) generating the signal including the rotation direction of the corresponding vehicle wheel detected from the quadrature decoder and the rotation period of the corresponding vehicle wheel detected from the timer and transmitting the generated signal to the receiver.

The first acceleration detection unit may include: a first acceleration sensor outputting the first acceleration signal for detecting an acceleration change according to the rotation of the corresponding vehicle wheel while having a first phase; a first small signal amplifier amplifying the first acceleration signal into a small signal; a first band pass filter performing filtering so as to pass through a low frequency band of the first acceleration signal amplified into the small signal; a first buffer amplifier amplifying the filtered first acceleration signal so as to be input to a buffer; and a first Schmitt trigger converting the first acceleration signal amplified by the first buffer amplifier into the digital signal and outputting the converted digital signal as the square wave.

The second acceleration detection unit may include: a second acceleration sensor outputting the second acceleration signal for detecting an acceleration change according to the rotation of the corresponding vehicle wheel while having a phase difference of 90° from the first phase; a second small signal amplifier amplifying the second acceleration signal into a small signal; a second band pass filter performing filtering so as to pass through a low frequency band of the second acceleration signal amplified into the small signal; a second buffer amplifier amplifying the filtered second acceleration signal so as to be input to a buffer; and a second Schmitt trigger converting the second acceleration signal amplified by the second buffer amplifier into the digital signal and outputting the converted digital signal as the square wave.

The receiver may include: a receiving unit receiving a signal including a rotation direction and a rotation period of the corresponding vehicle wheel transmitted from each of the plurality of transmitters; and a receiving control unit (ECU) determining the left and right of the vehicle by detecting the rotation direction of the corresponding vehicle wheel from a signal received through the receiving unit to identify the position of the corresponding vehicle wheel and determining the front and rear of the corresponding vehicle wheel by detecting the rotation period of the corresponding vehicle wheel to identify the position of the corresponding vehicle wheel.

The receiver may further include a display unit displaying of a position of the corresponding vehicle wheel according to a control of the receiving control unit (ECU).

According to a preferred embodiment of the present invention, there is provided a method for detecting a tire position, including: (A) allowing a plurality of transmitters mounted on each of a plurality of vehicle wheels to detect a rotation direction and a rotation period of corresponding vehicle wheel from first and second acceleration signals of the corresponding vehicle wheel and transmit a signal including the detected rotation direction and the rotation period to a receiver; (B) allowing the receiver to detect the rotation direction of the corresponding vehicle wheel from the received signal to determine the left and right of the corresponding vehicle wheel and identify the position of the corresponding vehicle wheel; and (C) allowing the receiver to detect the rotation period of the corresponding vehicle wheel from the received signal to determine the front and rear of the corresponding vehicle wheel, thereby identifying the position of the corresponding vehicle wheel.

The step (A) may include: (A-1) allowing each transmitter to convert the first and second acceleration signals into digital signals through first and second acceleration detection units of the corresponding vehicle wheel and output the converted digital signals as a square wave; (A-2) allowing a quadrature decoder to receive the first and second acceleration signals output as the square wave to detect a phase difference between the two signals, thereby detecting the rotation direction of the corresponding vehicle wheel and count the number of ticks output whenever phases of the two signals are changed to detect RPM of the corresponding vehicle wheel; (A-3) allowing a timer operated as reference clock signals to receive the first and second acceleration signals output as the square wave to count the number of clocks of the reference clock signals for each tick, thereby detecting the rotation period of the corresponding vehicle wheel; and (A-4) allowing a transmitting control unit (MCU) to generate a signal including the rotation direction detected from the quadrature decoder and the rotation period detected from the timer and transmit the generated signal to the receiver.

The step (A-1) may include: (A-1-1) outputting a first acceleration signal for detecting an acceleration change according to the rotation of the corresponding vehicle wheel while having a first phase; (A-1-2) amplifying the first acceleration signal into a small signal; (A-1-3) performing filtering so as to pass through a low frequency band of the first acceleration signal amplified into the small signal; (A-1-4) amplifying the filtered first acceleration signal so as to be input to a buffer; and (A-1-5) converting the first acceleration signal amplified so as to be input to the buffer into the digital signal and outputting the converted digital signal as the square wave.

The step (A-1) may include: (A-1-6) outputting a second acceleration signal for detecting an acceleration change according to the rotation of the corresponding vehicle wheel while having a phase difference of 90° from the first phase; (A-1-7) amplifying the second acceleration signal into a small signal; (A-1-8) performing filtering so as to pass through a low frequency band of the second acceleration signal amplified into the small signal; (A-1-9) amplifying the filtered second acceleration signal so as to be input to a buffer; and (A-1-10) converting the second acceleration signal amplified so as to be input to the buffer into the digital signal and outputting the converted digital signal as the square wave.

DESCRIPTION OF THE PREFERRED EMBODIMENTS

Figure 1:
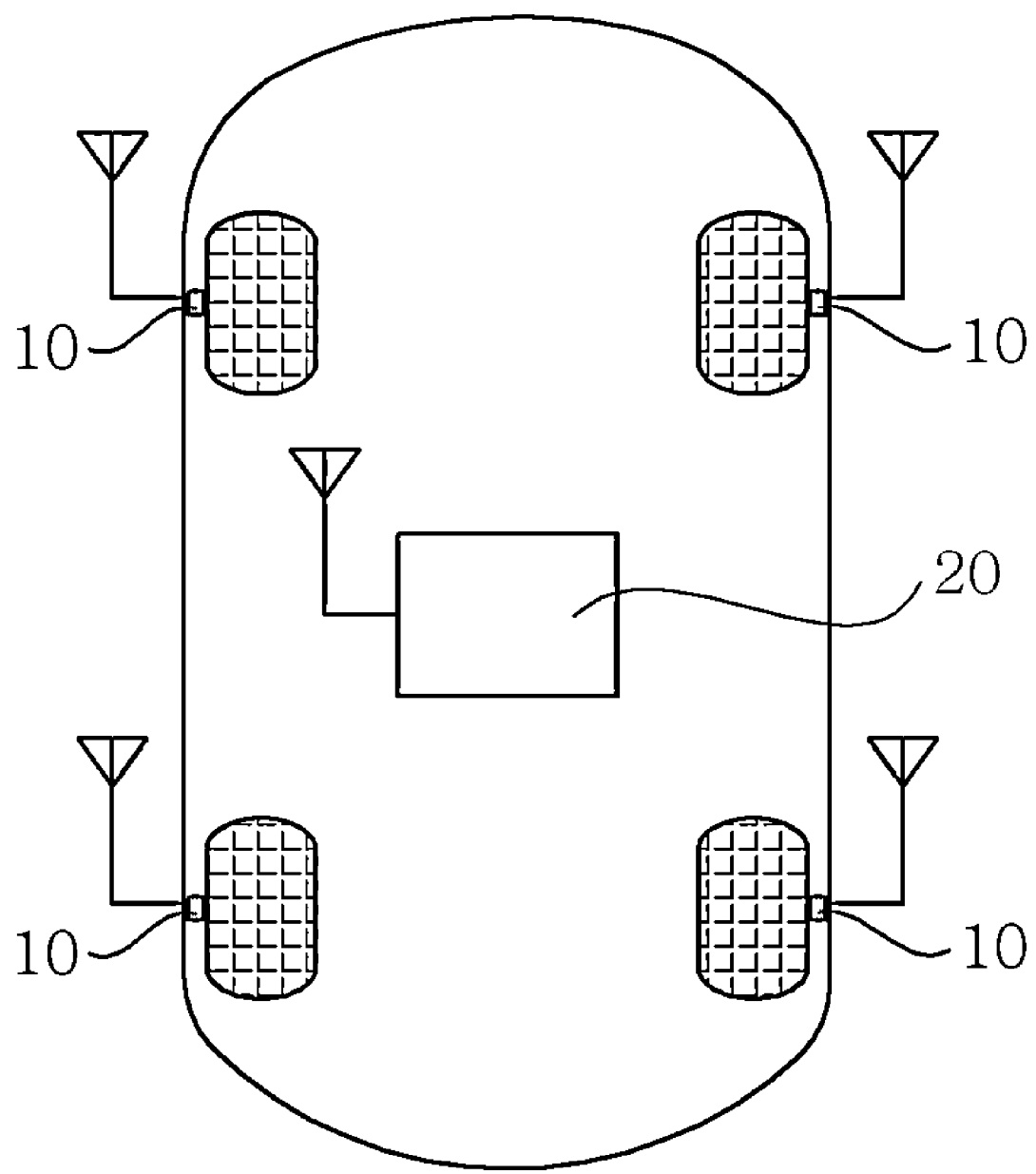
FIG. 1 is a conceptual diagram of a device for detecting a tire position according to a preferred embodiment of the present invention.

Various features and advantages of the present invention will be more obvious from the following description with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
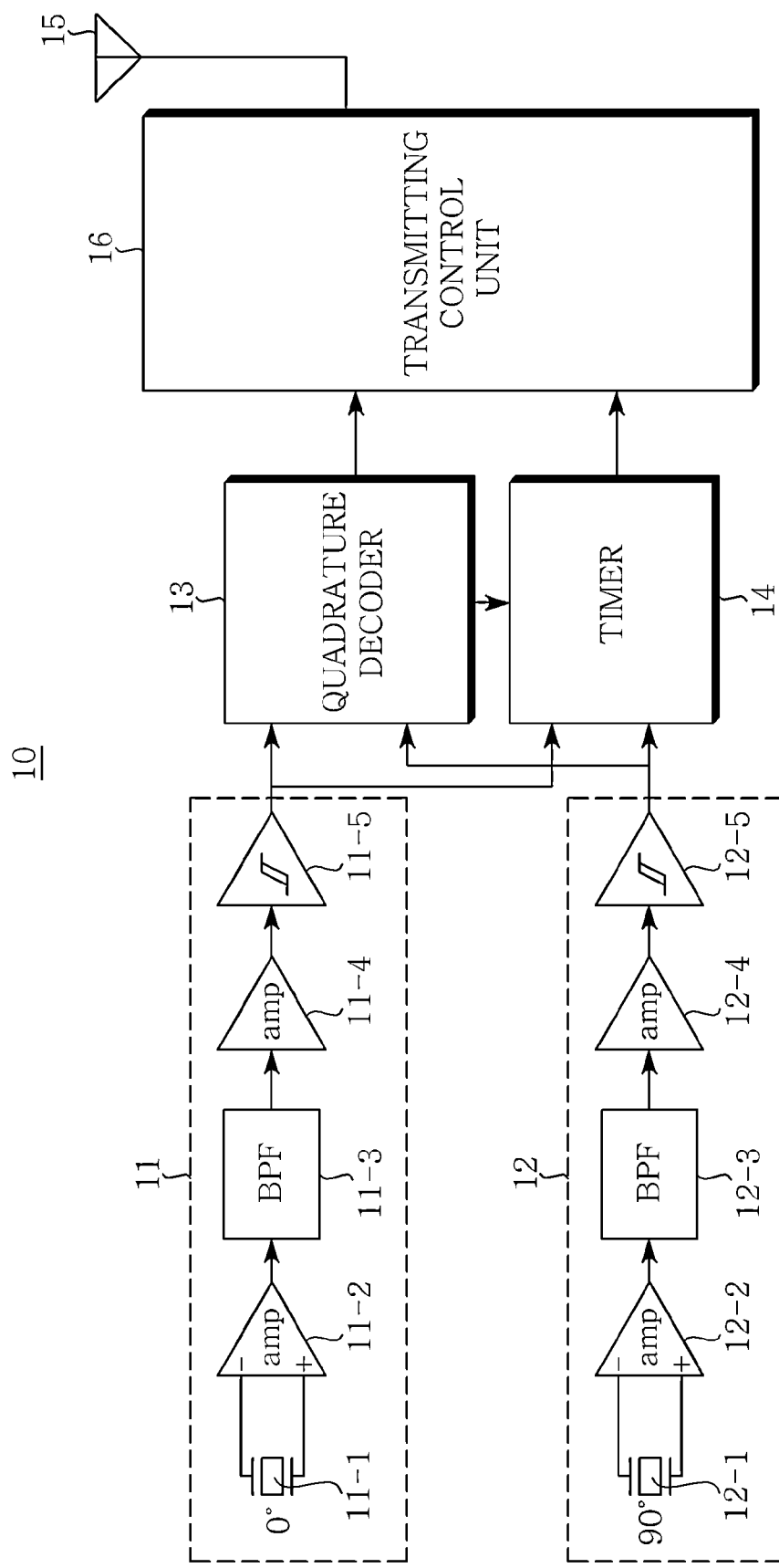
FIG. 2 is a detailed block diagram of a transmitter shown in FIG. 1.
Figure 3:
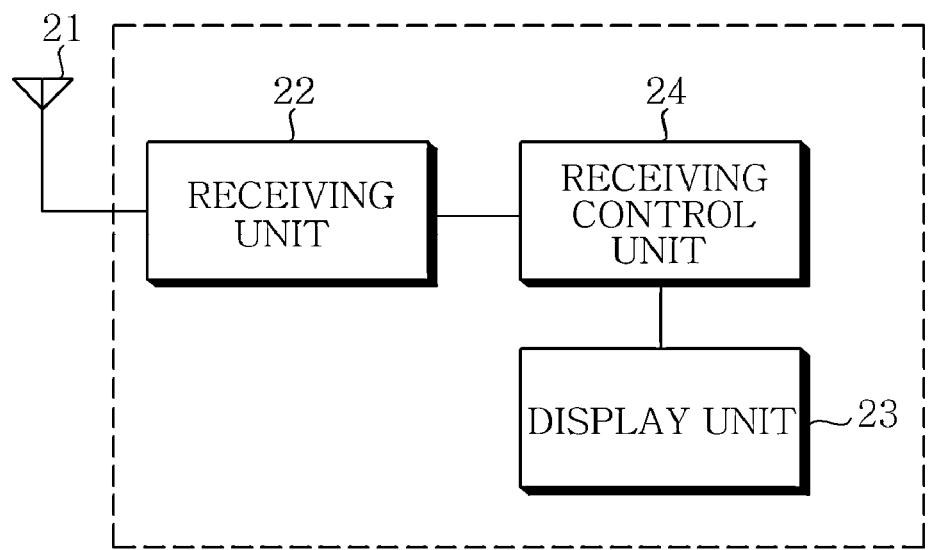
FIG. 3 is a detailed block diagram of a receiver shown in FIG. 1.

FIG. 1 is a conceptual diagram of a device for detecting a tire position according to a preferred embodiment of the present invention, FIG. 2 is a detailed block diagram of a transmitter shown in FIG. 1, and FIG. 3 is a detailed block diagram of a receiver shown in FIG. 1.

Referring to FIGS. 1 to 3, the device for detecting a tire position according to a preferred embodiment of the present invention may be configured to include a transmitter 10 and a receiver 20. The transmitters 10 are mounted on each of the plurality of vehicle wheels having a tire and detects and transmits a rotation direction and a rotation period of each vehicle wheel and the receiver 20 is mounted on a vehicle body and identifies the left and right of the corresponding vehicle wheel according to the rotation direction of each vehicle wheel transmitted from the transmitter 10 and identifies the front and rear of the corresponding vehicle wheel according to the rotation period of each vehicle wheel.

As shown in FIG. 2, each of the plurality of transmitters 10 may be configured to include a first acceleration detection unit 11, a second acceleration detection unit 12, a quadrature decoder 13, a timer 14, a transmitting antenna 15, and a transmitting control unit (MCU) 16.

The first acceleration detection unit 11 converts the first acceleration signal of the corresponding vehicle wheel into the digital signal and outputs the converted digital signals as a square wave.

The first acceleration detection unit 11 is configured to include a first acceleration sensor 11-1, a first small signal amplifier 11-2, a first band pass filter (BPF) 11-3, a first buffer amplifier 11-4, and a first Schmitt trigger 11-5.

The first acceleration sensor 11-1 outputs the first acceleration signal for detecting an acceleration change according to the rotation of the corresponding vehicle wheel while having a first phase (for example, 0°).

In this case, the first acceleration signal output from the first acceleration sensor 11-1 is a small signal and therefore, is amplified via the first small signal amplifier 11-2.

The first acceleration signal is low frequency and is therefore filtered through the first band pass filter (BPF) 11-3 so as to pass through the corresponding low frequency band.

Then, the filtered first acceleration signal is amplified (for example, about 7 times) by the first buffer amplifier 11-4 so as to be input to the buffer and is then converted into a digital signal strong against noise through the first Schmitt trigger 11-5 so as to be output as a square wave.

The second acceleration detection unit 12 converts the second acceleration signal of the corresponding vehicle wheel having a phase difference of 90° from the first acceleration signal into the digital signal and outputs the converted digital signal as the square wave.

The second acceleration detection unit 12 is configured to include a second acceleration sensor 12-1, a second small signal amplifier 12-2, a second band pass filter (BPF) 12-3, a second buffer amplifier 12-4, and a second Schmitt trigger 12-5, similar to the above-mentioned acceleration detection unit 11.

The second acceleration sensor 12-1 outputs the second acceleration signal for detecting the acceleration change according to the rotation of the corresponding vehicle wheel while a phase difference of 90° (for example, 90°) from the first phase (for example, 0°).

In this case, the second acceleration signal output from the second acceleration sensor 12-1 is also a small signal and therefore, is amplified via the second small signal amplifier 12-2.

The second acceleration signal is low frequency and is therefore filtered through the second band pass filter (BPF) 12-3 so as to pass through the corresponding low frequency band.

Then, the filtered second acceleration signal is amplified (for example, about 7 times) by the second buffer amplifier 12-4 so as to be input to the buffer and is then converted into a digital signal strong against noise through the second Schmitt trigger 12-5 so as to be output as a square wave.

Figure 4:
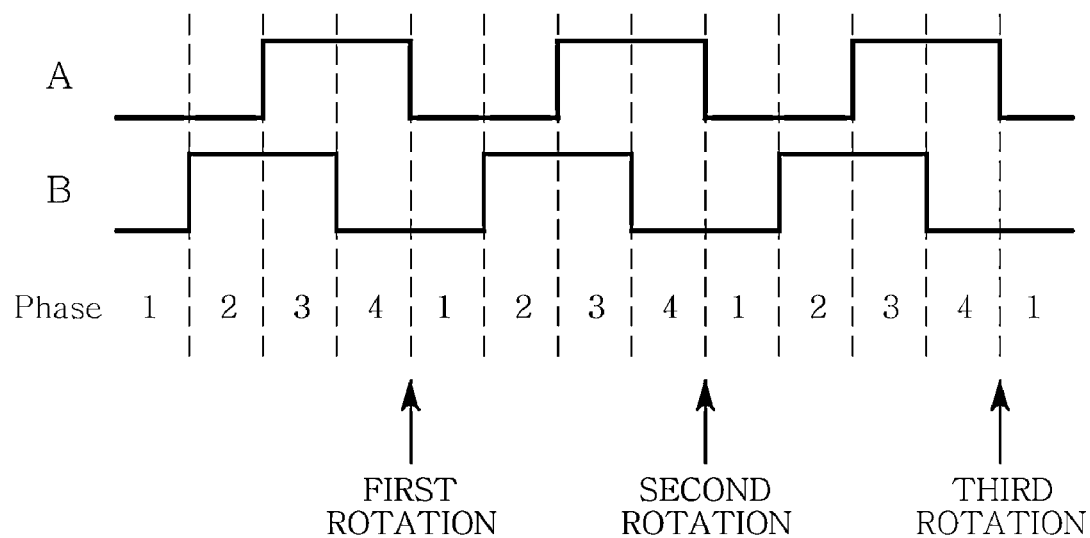
FIG. 4 is a diagram showing an example of converting first and second acceleration signals from first and second acceleration detection units shown in FIG. 2 into digital signals and outputting the converted digital signals as a square wave.

FIG. 4 is a diagram showing an example of converting the first and second acceleration signals from first and second acceleration detection units 11 and 12 into the digital signals and outputting the converted digital signals as the square wave.

As shown in FIG. 4, when A is referred to as the first acceleration signal and B is referred to as the second acceleration signal, it can be appreciated that two signals are output while having the phase difference of 90° from each other.

As described above, the first and second acceleration signals having the phase difference of 90° from each other are input to a quadrature decoder 13 as shape of the square wave.

The quadrature decoder 13 receives the first and second acceleration signals output as the square wave from the first and second acceleration detection units 11 and 12 to detect the phase difference between two signals, thereby detecting the rotation direction of the corresponding vehicle wheel and counts the number of ticks output whenever the phases of the two signals are changed, thereby detecting the RPM of the corresponding vehicle wheel.

In detail, the quadrature decoder 13 may detect the rotation direction and the RPM of the corresponding vehicle wheel from the phase difference between the first and second acceleration signals.

For example, as shown in FIG. 4, the case in which signal A input to the quadrature decoder 13 is led by 90° than signal B may be assumed to be + direction, the case in which B signal is led by 90° than signal A, may be assumed to be − direction, and vice versa.

In addition, the quadrature decoder 13 may count the number of ticks output whenever the phases of the two signals A and B are changed.

For example, when the number of ticks is four, the corresponding vehicle wheel may be considered as being rotated one time and when the number of ticks is eight, the corresponding vehicle wheel may be considered as being rotated two times.

When the number of ticks is counted as described above, the RPM of the corresponding vehicle wheel may be calculated.

The timer 14 is operated as a predetermined reference clock signal (for example, about 1M to 10M) and receives the first and second acceleration signals output as the square wave from the first and second acceleration detection units 11 and 12 to count the number of clocks of the reference clock signals for each tick output whenever the phases of the two signals are changed, thereby measuring a period of each tick.

The accurate period for each tick may be calculated through the timer 14, such that it is possible to measure the accurate rotation period of the corresponding vehicle wheel.

The transmitting control unit (MCU) 16 generates the signal including the rotation direction of the corresponding vehicle wheel detected from the quadrature decoder 13 and the rotation period of the corresponding vehicle wheel detected from the timer 14 and transmits the generated signal to the receiver 20 through the transmitting antenna 15.

The receiver 20 detects the rotation direction and the rotation period of the corresponding vehicle wheel from the signal transmitted from the transmitter 10 to identify the position of the corresponding vehicle wheel.

As shown in FIG. 3, the receiver 20 is configured to include a receiving unit 22 and a receiving control unit (ECU) 24.

The receiving unit 22 receives the signals including the rotation direction and the rotation period of the corresponding vehicle wheel transmitted from the transmitter 10 through the receiving antenna 21.

The receiving control unit (ECU) 24 detects the rotation direction and the rotation period of the corresponding vehicle wheel through the receiving unit 22 from the received signal to determine the position of the corresponding vehicle wheel.

For example, when the acceleration sensor having a phase leading 90° is mounted in a forward direction based on the right vehicle wheel of the vehicle, the receiving control unit (ECU) 24 may determine that the corresponding vehicle wheel is mounted at the right when the rotation direction is + and determine that the corresponding vehicle wheel is mounted at the left when the rotation direction is −.

On the other hand, when the acceleration sensor having a phase leading 90° is mounted in a forward direction based on the left vehicle wheel of the vehicle, the receiving control unit (ECU) 24 may determine that the corresponding vehicle wheel is mounted at the left when the rotation direction is + and determine that the corresponding vehicle wheel is mounted at the right when the rotation direction is −.

In addition, the receiving control unit (ECU) 24 determines the front and rear of the corresponding vehicle wheel through the rotation period of the corresponding vehicle wheel.

To this end, the rotation period relation of the vehicle wheel according to the physical position between the front and real vehicle wheels will be reviewed.

Generally, the vehicle includes the steerable vehicle shaft and the fixed vehicle shaft. In the preferred embodiment of the present invention, the steerable vehicle shaft is defined by a front vehicle shaft and the non-steerable vehicle shaft fixed to the vehicle shaft is defined by the rear vehicle shaft.

In the case of the front vehicle shaft, the angle of the vehicle wheel may be freely changed within the predetermined angle by the steering of the driver. The rear vehicle shaft is fixed to the vehicle body and can not be steered and coincides with the traveling direction of the vehicle.

Figure 5:
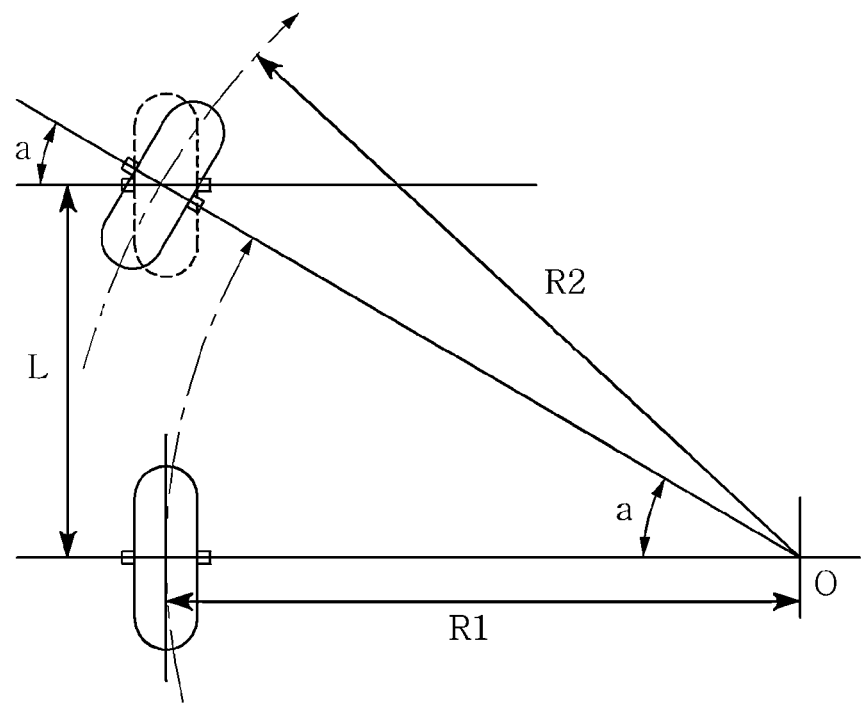
FIGS. 5 and 6 are conceptual diagrams for describing a front and rear determination of a vehicle wheel according to a preferred embodiment of the present invention.
Figure 6:
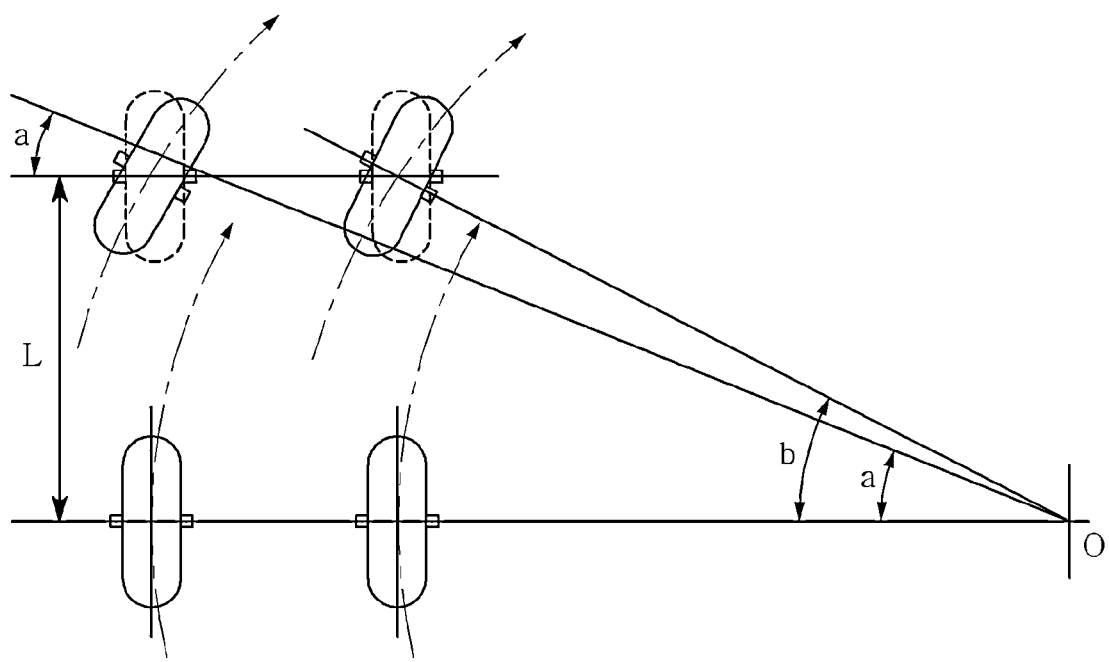

FIGS. 5 and 6 are conceptual diagrams for describing a front and rear determination of a vehicle wheel according to a preferred embodiment of the present invention.

According to FIGS. 5 and 6, a distance between the front vehicle shaft and the rear vehicle shaft (hereinafter, referred to as an 'inter-shaft distance L') and an inter-vehicle wheel distance (hereinafter, referred to as a 'rear wheel minimum rotation radius R1') between a central point O of the rear vehicle shaft and a vehicle wheel mounted on the rear wheel and a distance (hereinafter, referred to as referred to as a 'front wheel minimum rotation radius R2') between the central point O and a vehicle wheel mounted on the front wheel have the following relation.

When the vehicle is steered by angle a during the traveling, the rear wheel has the minimum rotation radius R1 and the front wheel has the minimum rotation radius R2.

In this case, the minimum rotation radius R and the moving distance D are obtained by a formula obtaining a circumference such as D=2ΠR. Therefore, the moving distance D has a proportional relationship with the minimum rotation radius R and the difference between the front wheel and the rear wheel has a difference by a ratio of R1/R2.

This is represented by the following Equation.

$$\frac{R1}{R2} = \cos(\alpha) \qquad \text{[Equation 1]}$$

Where a is a steering angel of the front wheel.

When the steering is not performed during the traveling of the vehicle, the moving distance between the front wheel and the rear wheel is theoretically the same.

However, the slight steering is made when the vehicle generally goes straight during the traveling. As described above, when the vehicle is steered (a>0), the front wheel minimum rotation radius R2 is larger than the rear minimum rotation radius R1 at all times.

Therefore, the difference in the moving distance between the front wheel and the rear wheel is generated when the vehicle moves by a predetermined distance due to a mismatch between the minimum rotation radius R1 of the rear wheel and the minimum rotation radius R2 of the front wheel, which immediately represents the difference in RPM.

When the difference value in RPM of the corresponding vehicle wheel is accumulated by the steering, the difference between the front wheel and the rear wheel is generated.

That is, the difference in RPM represents the period, the receiving control unit (ECU) 24 determines that a short side having the short rotation period of the corresponding vehicle wheel is the front wheel and a long side of the rotation period of the corresponding vehicle wheel is the rear wheel.

Meanwhile, the receiver 20 represents the position of the corresponding vehicle wheel through the receiving control unit (ECU) 24 and may further include a display unit 23 displaying the state such as the tire pressure of the corresponding vehicle wheel, or the like.

The user may confirm the tire state of the corresponding vehicle wheel while seeing the state information of the corresponding displayed on the display unit 23, thereby performing the exchange or the replacement of the tire.

Figure 7:
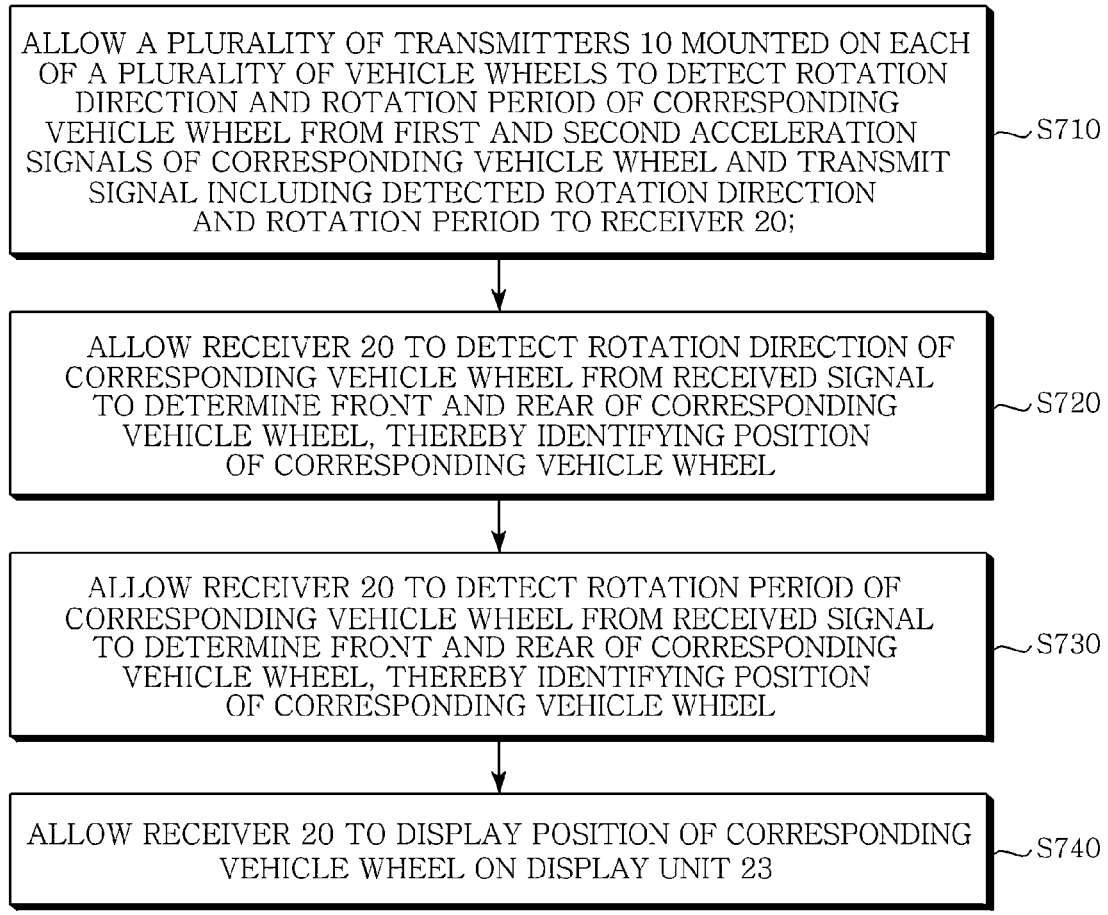
FIG. 7 is a flow chart showing a method for detecting a tire position according to a preferred embodiment of the present invention.
Figure 8:
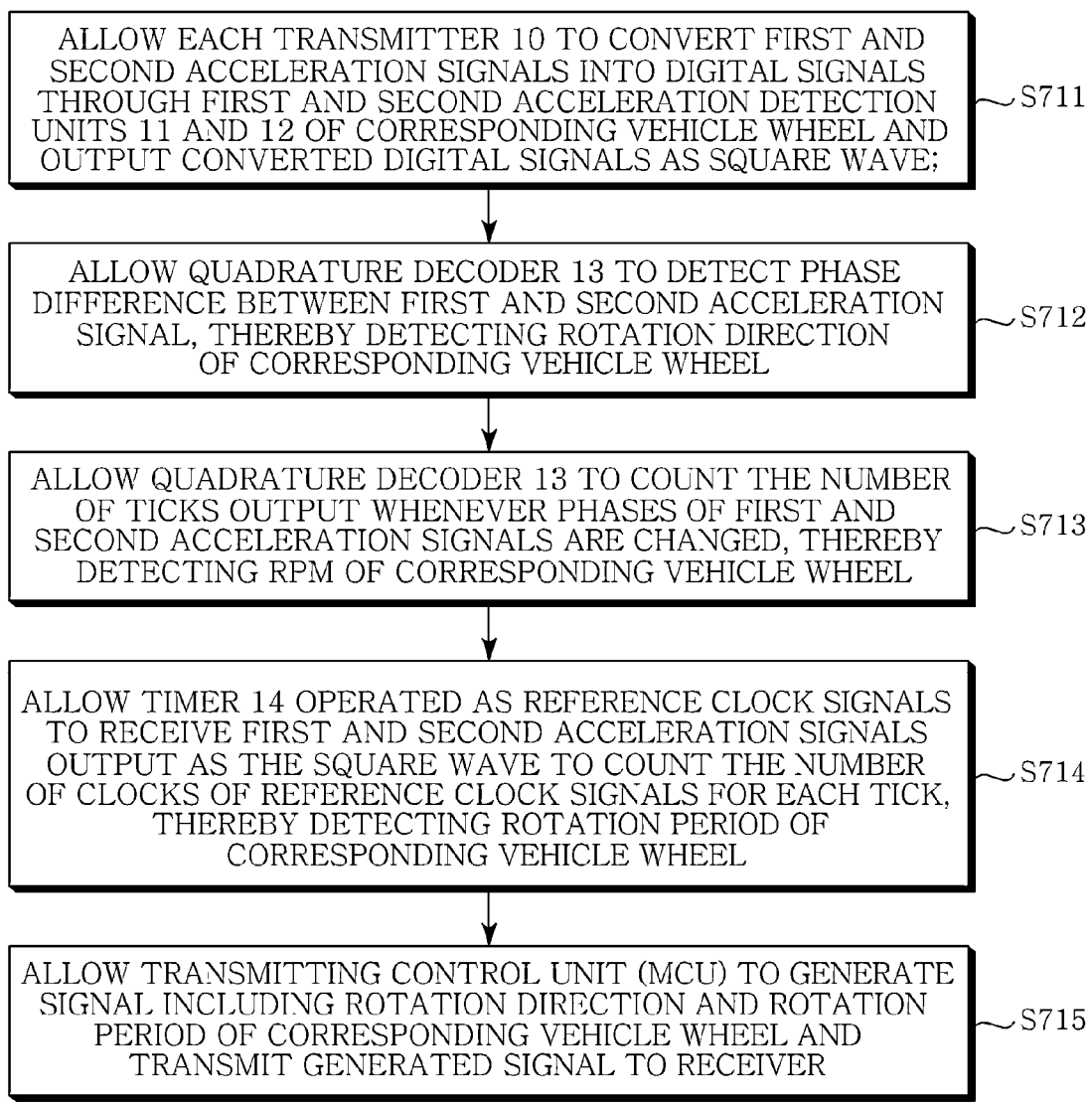
FIG. 8 is a detailed flow chart of a transmitting step shown in FIG. 7.

Meanwhile, FIG. 7 is a flow chart showing a method for detecting a tire position according to a preferred embodiment of the present invention and FIG. 8 is a detailed flow chart of a transmitting (S710) shown in FIG. 7.

Referring to FIGS. 7 and 8, the plurality of transmitters 10 each mounted on the plurality of vehicle wheels detects the rotation direction and the rotation period from the first and second acceleration signals of the corresponding vehicle wheel and transmits the signal including the detected rotation direction and rotation period to the receiver 20 (S710).

Then, the receiver 20 detects the rotation direction of the corresponding vehicle wheel from the received signal by receiving the signal transmitted from the transmitter 10 to determine the left and right of the corresponding vehicle wheel, thereby identifying the position (S720).

In addition, the receiver 20 detects the rotation period of the corresponding vehicle wheel from the received signal to determine the front and rear of the corresponding vehicle wheel, thereby identifying the position (S730).

At steps S720 and S730, the identified position of the corresponding vehicle wheel may be displayed on the display unit 23.

Meanwhile, the transmitting (S710) performs steps as shown in FIG. 8.

First, each transmitter 10 converts the first and second acceleration signals into the digital signals through the first and second acceleration detection units 11 and 12 of the corresponding vehicle wheel and outputs the converted digital signals as the first and second acceleration signal square waves (S711).

In this case, the first acceleration signal output as the square wave is subjected to outputting the first acceleration signal for detecting the acceleration change according to the rotation of the corresponding vehicle wheel while having the first phase by the first acceleration sensor 11-1, amplifying the first acceleration signal into the small signal through the first small signal amplifier 11-2 and then, performing filtering so as to pass through the low frequency band of the first acceleration signal amplified with the small signal through the first band pass filter (BPF) 11-3, amplifying the filtered first acceleration signal through the first buffer amplifier 11-4 so as to be input to the buffer, and converting the first acceleration signal amplified so as to be input to the buffer into the digital signal and outputting the converted digital signal as the square wave.

Similarly, the second acceleration signal converted into the digital is subjected to outputting the second acceleration signal for detecting the acceleration change according to the rotation of the corresponding vehicle wheel while having the phase difference of 90° from the first phase by the second acceleration sensor 12-1, amplifying the second acceleration signal into the small signal through the second small signal amplifier 12-2 and then, performing filtering so as to pass through the low frequency band of the second acceleration signal amplified with the small signal through the second band pass filter (BPF) 12-3, amplifying the filtered second acceleration signal through the second buffer amplifier 12-4 so as to be input to the buffer, and converting the second acceleration signal amplified so as to be input to the buffer into the digital signal and outputting the converted digital signal as the square wave.

At step S711, the quadrature decoder 13 detects the phase difference between two signals by receiving the first and second acceleration signals output as the square wave to detect the rotation direction of the corresponding vehicle wheel (S712) and counts the number of ticks output whenever the phases of two signals are changed to detect the RPM of the corresponding vehicle wheel (S713).

In this case, the timer 14 operated as the reference clock signal counts the number of clocks of the reference clock signal for each tick by receiving the first and second acceleration signals output as the square wave to detect the rotation period of the corresponding vehicle wheel (S714).

Then, the transmitting control unit (MCU) 16 generates the signal including the rotation direction of the corresponding vehicle wheel detected from the quadrature decoder 13 and the rotation period of the corresponding vehicle wheel detected from the timer 14 and transmits the generated signal to the receiver 20 (S715), as described above.

As described above, the device and method for detecting a tire position according to the preferred embodiment of the present invention can automatically recognize the tire position without needing to perform the separate ID recognition working through the ID information and the ID information update and thus, can improve the freedom of change of the tire position by the exchange or the replacement of the tire.

In addition, the preferred embodiments of the present invention can digitize and process the signals from the acceleration sensor to be strong against the noise and reduce the load, thereby rapidly detecting the positions of each tire and improving the detection accuracy and saving the costs without needing to mount the separate signal lines.

As set forth above, the preferred embodiments of the present invention can automatically recognize the positions of each tire without performing the separate ID recognition working through the ID information and the ID information update, thereby improving the freedom of change of the tire position due to the exchange or replacement of the tire.

In addition, the preferred embodiments of the present invention can digitize and process the signals from the acceleration sensor to be strong against the noise and reduce the load of the MCU, thereby rapidly detecting the positions of each tire and improving the detection accuracy and saving the costs without needing to mount the separate signal lines.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A device for detecting a tire position, comprising:
a plurality of transmitters provided on each of a plurality of vehicle wheels having a tire and detecting and transmitting a rotation direction and a rotation period of each vehicle wheel; and
a receiver identifying the left and right position of the corresponding vehicle wheel according to the rotation direction of each vehicle wheel transmitted from the transmitter and identifying the front and rear position of the corresponding vehicle wheel according to the rotation period of each vehicle wheel,
wherein each transmitter includes:

a first acceleration detection unit converting a first acceleration signal of the corresponding vehicle wheel into a digital signal and outputting the converted digital signal as a square wave;

a second acceleration detection unit converting a second acceleration signal of the corresponding vehicle wheel while having a phase difference of 90° from the first acceleration signal into a digital signal and outputting the converted digital signal as the square wave;

a quadrature decoder receiving the first and second acceleration signals output as the square wave from the first and second acceleration detection units to detect a phase difference between the two signals, thereby detecting the rotation direction of the corresponding vehicle wheel and counting the number of ticks output whenever the phases of the two signals are changed to detect RPM of the corresponding vehicle wheel;

a timer operated as a reference clock signal and receiving the first and second acceleration signals output as the square wave from the first and second acceleration detection units to count the number of clocks of the reference clock signals for each tick output whenever the phases of the two signals are changed, thereby measuring a period of each tick to detect the rotation period of the corresponding vehicle wheel; and a transmitting control unit (MCU) generating the signal including the rotation direction of the corresponding vehicle wheel detected from the quadrature decoder and the rotation period of the corresponding vehicle wheel detected from the timer and transmitting the generated signal to the receiver.

2. The device for detecting a tire position as set forth in claim 1, wherein the first acceleration detection unit includes:

a first acceleration sensor outputting the first acceleration signal for detecting an acceleration change according to the rotation of the corresponding vehicle wheel while having a first phase;

a first small signal amplifier amplifying the first acceleration signal into a small signal;

a first band pass filter performing filtering so as to pass through a low frequency band of the first acceleration signal amplified into the small signal;

a first buffer amplifier amplifying the filtered first acceleration signal so as to be input to a buffer; and a first Schmitt trigger converting the first acceleration signal amplified by the first buffer amplifier into the digital signal and outputting the converted digital signal as the square wave.

3. The device for detecting a tire position as set forth in claim 1, wherein the second acceleration detection unit includes:

a second acceleration sensor outputting the second acceleration signal for detecting an acceleration change according to the rotation of the corresponding vehicle wheel while having a phase difference of 90° from the first phase;

a second small signal amplifier amplifying the second acceleration signal into a small signal;

a second band pass filter performing filtering so as to pass through a low frequency band of the second acceleration signal amplified into the small signal;

a second buffer amplifier amplifying the filtered second acceleration signal so as to be input to a buffer; and a second Schmitt trigger converting the second acceleration signal amplified by the second buffer amplifier into the digital signal and outputting the converted digital signal as the square wave.

4. The device for detecting a tire position as set forth in claim 1, wherein the receiver includes:

a receiving unit receiving a signal including a rotation direction and a rotation period of the corresponding vehicle wheel transmitted from each of the plurality of transmitters; and a receiving control unit (ECU) determining the left and right position of the vehicle by detecting the rotation direction of the corresponding vehicle wheel from a signal received through the receiving unit to identify the position of the corresponding vehicle wheel and determining the front and rear position of the corresponding vehicle wheel by detecting the rotation period of the corresponding vehicle wheel from the received signal to identify the position of the corresponding vehicle wheel.

5. The device for detecting a tire position as set forth in claim 4, wherein the receiver further includes a display unit displaying position of the corresponding vehicle wheel according to a control of the receiving control unit (ECU).

6. A method for detecting a tire position, comprising:

allowing a plurality of transmitters mounted on each of a plurality of vehicle wheels to detect a rotation direction and a rotation period of corresponding vehicle wheel from first and second acceleration signals of the corresponding vehicle wheel and transmit a signal including the detected rotation direction and the rotation period to a receiver;

allowing the receiver to detect the rotation direction of the corresponding vehicle wheel from the received signal to determine the left and right position of the corresponding vehicle wheel and identify the position of the corresponding vehicle wheel; and allowing the receiver to detect the rotation period of the corresponding vehicle wheel from the received signal to determine the front and rear position of the corresponding vehicle wheel, thereby identifying the position of the corresponding vehicle wheel, wherein the step of allowing a plurality includes:

allowing each transmitter to convert the first and second acceleration signals into digital signals through first and second acceleration detection units of the corresponding vehicle wheel and output the converted digital signals as a square wave;

allowing a quadrature decoder to receive the first and second acceleration signals output as the square wave to detect a phase difference between the two signals, thereby detecting the rotation direction of the corresponding vehicle wheel and count the number of ticks output whenever phases of the two signals are changed to detect RPM of the corresponding vehicle wheel;

allowing a timer operated as reference clock signals to receive the first and second acceleration signals output as the square wave to count the number of clocks of the reference clock signals for each tick, thereby detecting the rotation period of the corresponding vehicle wheel; and allowing a transmitting control unit (MCU) to generate a signal including the rotation direction detected from the quadrature decoder and the rotation period detected from the timer and transmit the generated signal to the receiver.

7. The method as set forth in claim 6, wherein the step of allowing each transmitter includes:

outputting a first acceleration signal for detecting an acceleration change according to the rotation of the corresponding vehicle wheel while having a first phase;

amplifying the first acceleration signal into a small signal;

performing filtering so as to pass through a low frequency band of the first acceleration signal amplified into the small signal;

amplifying the filtered first acceleration signal so as to be input to a buffer; and converting the first acceleration signal amplified so as to be input to the buffer into the digital signal and outputting the converted digital signal as the square wave.

8. The method as set forth in claim 7, wherein the step of allowing each transmitter includes:

outputting a second acceleration signal for detecting an acceleration change according to the rotation of the corresponding vehicle wheel while having a phase difference of 90° from the first phase;

amplifying the second acceleration signal into a small signal;

performing filtering so as to pass through a low frequency band of the second acceleration signal amplified into the small signal;

amplifying the filtered second acceleration signal so as to be input to a buffer; and converting the second acceleration signal amplified so as to be input to the buffer into the digital signal and outputting the converted digital signal as the square wave.

* * * * *